United States Patent
Peters et al.

(10) Patent No.: US 12,045,870 B2
(45) Date of Patent: *Jul. 23, 2024

(54) APPARATUS AND METHOD FOR AN ELECTRONIC MARKETPLACE FOR CREATIVE WORKS

(71) Applicants: Skye Peters, Los Angeles, CA (US); John W. Olivo, Jr., Beverly Hills, CA (US)

(72) Inventors: Skye Peters, Los Angeles, CA (US); John W. Olivo, Jr., Beverly Hills, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 17/322,623

(22) Filed: May 17, 2021

(65) Prior Publication Data
US 2021/0406995 A1 Dec. 30, 2021

Related U.S. Application Data

(63) Continuation of application No. 15/491,959, filed on Apr. 19, 2017, now Pat. No. 11,042,927.

(Continued)

(51) Int. Cl.
*G06Q 30/00* (2023.01)
*G06F 21/10* (2013.01)
(Continued)

(52) U.S. Cl.
CPC ......... *G06Q 30/0643* (2013.01); *G06F 21/10* (2013.01); *G06Q 20/123* (2013.01)

(58) Field of Classification Search
CPC ... G06Q 30/0643; G06Q 20/123; G06F 21/10
See application file for complete search history.

(56) References Cited

U.S. PATENT DOCUMENTS 7,032,819 B2 * 4/2006 Iida ................. G11B 27/36
7,996,882 B2 * 8/2011 L'Heureux ........... G06F 21/105
726/4

(Continued)

OTHER PUBLICATIONS

New World Encyclopedia; "Digital Audio"; Feb. 27, 2016; New World Encyclopedia (Year: 2016).*

(Continued)

*Primary Examiner* — Anne M Georgalas
(74) *Attorney, Agent, or Firm* — Olivo IP Law Group P.C.; John W. Olivo, Jr.

(57) ABSTRACT

In the creative community, a need exists to efficiently market creative works including music, concerts, photographic, video programs, motion pictures, two and three dimensional works of art and literary works. The cost of creating works of art has never been less. Computer programs like Garage Band and iMovie have lowered production costs so that more people than ever before are engaged in creativity. The present invention links the creative community with investors, venue owners, social media influencers, other artists, art critics, art distributors, literary agents, art brokers and dealers and the overall audience for creative works. The present invention represents a significant augmentation to the traditional artists and repertoire departments of the major record companies and will enable a bidding marketplace so that creative works may be monetized at the moment of creation and combined with other preexisting artwork to enable marketing compilations or derivative works expeditiously. Advertisers may in turn sponsor selected artists or works of art.

10 Claims, 18 Drawing Sheets

Related U.S. Application Data

(60) Provisional application No. 62/325,870, filed on Apr. 21, 2016.

(51) Int. Cl.
*G06Q 20/12* (2012.01)
*G06Q 30/0601* (2023.01)

(56) References Cited

U.S. PATENT DOCUMENTS

| | | | | |
|---|---|---|---|---|
| 8,219,494 | B1* | 7/2012 | Pride | G06F 21/10 |
| | | | | 706/26 |
| 8,584,197 | B2* | 11/2013 | King | G06Q 30/0274 |
| | | | | 705/53 |
| 9,836,615 | B2* | 12/2017 | Ikeda | G10H 1/0058 |
| 2005/0289011 | A1* | 12/2005 | Sporny | G06F 21/10 |
| | | | | 705/26.1 |
| 2007/0078773 | A1* | 4/2007 | Czerniak | G06F 21/10 |
| | | | | 705/57 |
| 2008/0114665 | A1* | 5/2008 | Teegarden | G06Q 30/06 |
| | | | | 705/300 |
| 2008/0228578 | A1* | 9/2008 | Mashinsky | H04L 67/02 |
| | | | | 709/224 |
| 2008/0288371 | A1* | 11/2008 | Holzapfel | G06Q 30/0641 |
| | | | | 705/26.62 |
| 2012/0226602 | A1* | 9/2012 | Narcisse | H04W 4/029 |
| | | | | 709/204 |
| 2013/0103592 | A1* | 4/2013 | Shenk | G06Q 30/0607 |
| | | | | 705/26.7 |
| 2013/0275275 | A1* | 10/2013 | Lemmons | G06Q 30/06 |
| | | | | 705/27.1 |

OTHER PUBLICATIONS

Jim Lynch; "15 great video and audio editing apps for the Mac"; Mar. 18, 2016; cio.com (Year: 2016).* www.musicxray.com; www.musicxray.com/i-am-a-music-artist; Apr. 1, 2016; https://web.archive.org/web/20160401162405/http://www.musicxray.com/i-am-a-music-artist (Year: 2016).*

Ben Sisario; "Web Helps Musicians Sell Shares of Royalties"; Apr. 21, 2013; New York Times (Year: 2013).*

PTO-892 Reference Y ("Y"): Richard de Atley; "New Device Provides Custom-Made Music Cassettes"; Nov. 17, 1988; Journal Record (Year: 1988).*

"Amazon beats Apple, Google with new music locker service," by Alex Pham, Los Angeles Times [Los Angeles, Calif], Mar. 30, 2011, B. 3 (Year: 2011).*

"Artists and Record Companies Need a Fair Digital Marketplace," Targeted News Service [Washington, D.C.], Jul. 29, 2015 (Year: 2015).*

* cited by examiner

APPARATUS AND METHOD FOR AN ELECTRONIC MARKETPLACE FOR CREATIVE WORKS

PRIORITY CLAIMS

This application is a continuation of U.S. patent application Ser. No. 15/491,959, filed Apr. 19, 2017, which claims the benefit of U.S. Provisional Patent Application Ser. No. 62/325,870, filed on Apr. 21, 2016, all of which are incorporated herein by reference.

BACKGROUND OF THE INVENTION

In the creative community traditional lines of creative work distribution have been disrupted by electronic distribution mechanisms. Early entrants like Napster were supplanted by services such as iTunes and Amazon, notably because an effective payment collection was introduced. Subsequently, the practice of stocking physical stores with phonograph albums, tapes and later CD's has largely been replaced by downloading music via the internet to end users desiring to view and listen to creative works.

In parallel, audio and video programs, largely created by recording artists and performers with microphones and cameras, have in turn favored other disruptive technology, using computers to create art. Analog recording studios have largely been replaced with video and music producers who use their computers to create and edit creative works electronically. Accordingly, disruptive technology has placed into the hands of artists the means to create art and distribute it without necessarily involving such established organizations such as movie studios and record companies. Instead, artists may use software such as iMovie and Garage Band, among numerous others, to create audio and video programs at home.

Various mechanisms exist to for artist to distribute their programs electronically, such as Sound Cloud and iTunes. Artists may create programs and in turn share them with their audience or other interest parties. Despite the availability of various distribution hardware and software, artists have been slow or have even completely resisted electronic distribution (self-publication) as a mechanism to distribute their works, for fear of not being paid, and indeed, due to the absence of any mechanism to price and distribute creative works in real time, or at least distribute creative works instantaneously, advertise and market them, and then have a fair market price established so that monetization of creative works may take place efficiently in a manner whereby the artist is fairly compensated.

The process by which artists were traditionally managed by record companies is called "A & R" or artists and repertoire. The A&R division of a record label is responsible for finding new recording artists and bringing those artists to the record company. Personnel in the A&R division are expected to understand the current tastes of the market and to be able to find artists who will be commercially successful. For this reason, A&R people are often young and many are musicians, music journalists or critics and possibly record producers.

An A&R executive is generally authorized to offer an artist a record contract, often in the form of a "deal-memo", a short informal document that establishes a business relationship between the recording artist and the record company. The actual contract negotiations will typically be carried out by competing and opposing entertainment lawyers, hired by the artist's management team and the record company. Likewise, in the production of video creative works for television or movies, a similar process occurs. With the prior art, the "deal-makers", such as A & R executives, rely significantly on the word of mouth of trusted associates, critics, business contacts, and those with a proven record of success. Predictably, the "deal-makers" tend to favor the artists well-known to them, often local in proximity to the record company or movie studio, so that working with the artist is not geographically difficult.

The A&R division of a record label traditionally oversees the recording process. This includes helping the artist to find the right record producer, scheduling time in a recording studio and advising the artist on all aspects of making a high-quality recording. They work with the artist to choose the best songs (i.e, repertoire) for their record. For artists who do not write their own music, the A&R person will assist in finding songs and songwriters. A&R executives maintain contact with their counterparts at music publishing companies to get new songs and material from songwriters and producers. In the past, the availability of songwriter material not in finished form (for example, "beats") was not possible unless you knew of the source. Online marketing and pricing has to this point not been available.

The electronic marketplace application represents a significant augmentation to the traditional 'artists and repertoire' departments of the major records companies. Record companies may commercially partner with the application, whereby their A&R personnel can discover, interact with, and mentor artists of their liking. A&R personnel are expected to understand the current tastes of music and be able to find artists who will be commercially successful. Searching for new talent on platforms like YouTube and Sound Cloud remains inefficient.

What is lacking is a version of a music-oriented bidding marketplace, where buyers & sellers are joined seamlessly, and where artists and "A&R" are joined seamlessly, all within an electronic marketplace for creative works. A&R will have access to view Artists organized by genre and/or popularity. They may also go over an Artist's reviews, view their portfolio and share with their record label.

As the record nears completion, the A&R department works closely with the artist to determine whether the record is acceptable to the record company. This process may include suggesting that new songs need to be written or that some album tracks need to be re-recorded, reworked or rewritten. A key issue is whether the album has a single: a particular track, which can be used to market the record on the radio, for example. This is how music has evolved, similar to television and film.

In the past electronic distribution and marketing was not available and even today, it is not used to its potential. The world of artists who use software to create music and video art with programs like Garage Band and iMovie will use software such as Sound Cloud to attempt this process, but what is lacking is a version of Ebay, where buyers and sellers are joined seamlessly and where creators and "A & R" are joined seamlessly. What is lacking is a seamless electronic marketplace for creative works.

In the past, derivative works and compilations have frequently triggered the need for copyright royalties to be divided. However, younger generations of artists are often not familiar with the correct legal protocol for creating new works of art based on prior copyrighted works of art, notably music. Instead, current artists are often taught to avoid adapting what is old with a new expression of that art, resulting in historic artists being overlooked in new credits as a foundational element in a newly creative work, which may be classified as a derivative work or compilation. Often, competing record companies steer new artists towards one foundational body of work versus another, stifling creativity. A few break through artists transcend this effect, for example, Amy Winehouse authored "Tears Dry On Their Own" which was derived and or inspired by the previous work "Aint No Mountain High Enough" by Ashford & Simpson. With that work, all three artists are credited, but such a process worked because the standing of those involved were significant enough. Conversely, the vast majority of young aspiring artists do not know how to go about using existing words to inspire derivative works, thinking that they must steer clear of that for fear of legal repercussions.

In the past, would be investors in new artists often must rely on word of mouth for investment opportunities in new talent. Sorting through Sound Cloud to look for talent is like looking for a needle in a haystack. Furthermore, critics (paid or unpaid) often must wait until art is published and spoon-fed to them, because a commercial exchange does not exist for brokering electronic media. Brokering media or the building blocks of media (for example, sounds or so-called "beats") does not happen electronically in a way where the artist is paid directly for their creative work; rather, music producers generally rely on known avenues of creativity (often overlooking new sources or artists) in order to build music portfolios they may take to the record companies, completely analogous to traditional A & R methodology. While this commercial mode of operation has served the public fairly well, new disruptive technology exists to take the traditional A & R and meld it together with a fair market value exchange, much akin to Ebay. Furthermore, for investors familiar with trading well-known securities such as equities or stocks or bonds, there exists effective media exchange for trading and investing in art, either in finished works of art or the building blocks of art, such as "beats".

Within the music industry, the payment process is negotiated between the artist, record label, and other potential parties, with the payment split percentages negotiated individually on a case by case basis. Among established members of the industry, points can be negotiated based on various factors pertaining to each artist. However, outsiders looking to break in to the music industry are at a disadvantage when it comes to negotiating payment splits and industry contracts. Music streaming applications that operate by charging monthly membership fees, such as Spotify or Apple Music, also negotiate on a case by case basis with each artist regarding how the artist will get paid through the subscription streaming platform.

SUMMARY OF THE INVENTION

The electronic marketplace application creates an intimate, members-only music based social media experience. The application also engages a bidding marketplace where creative works can be monetized at the moment of creation. It also links the creative community with investors, venue owners, social media influencers, musicians, music producers, A&R, brand name companies, art critics, art brokers, art dealers, literary agents, and other artists alike.

According to the present invention, artists who create works of art are encouraged to seek copyright protection regarding the same. Furthermore, artists are encouraged to work with other artists to create compilations of art or derivative works of art to in turn create more works of art, which may also give rise to additional copyright protection. In this manner, artists may create art electronically, file it within a database under the control of the present invention, and then, interact with other artists, investors, social media influencers, art critics, art distributors, art audiences and art dealers and traders. According to the present invention, the prices of art may therefore fluctuate as the supply and demand for art is set based on widespread yet organized and targeted audiences and participants in the process for the dissemination of art.

According to the present invention, creators of copyright eligible works of art utilize an internet connected information platform to register, secure, finance, protect, market, sell and collaborate with others their copyrightable works of art. The possibilities are endless. By copyrightable works of art, the present invention contemplates the protection and marketing of music and video programs among all those involved in creating them, marketing them, selling them, using them, uploading, playing them publicly and privately, collaborating with them and in any way, helping to promote them much in the same way traditional A & R departments have for years in the record companies with respect to music. The present invention provides a marketplace for creative works of art much like Kickstarter. In order to participate in the marketplace, you must be classified according to your role or roles within the marketplace. For example, students of music may be admitted for free or reduced cost, while record companies pay at a higher rate. Users may consist of social media influencers, buyers, sellers, emerging or aspiring artists, booking agents for live music venues, students, A & R departments of the major record companies, well-established artists who want to market their works or even portions of their work or building blocks of their work (for example, "beats"). The marketing may be done by the worldwide web, but may also include an opportunity for banks or potential investors to invest or back various artists (akin to daily fantasy sports) so that an investor may back an artist or a derivative work or compilation and invest at a certain valuation, speculating that the value may go up. In that way, the present invention may provide an exit strategy as well as a point of entry for investors, much the same way art investors attend art auctions historically, except, the present invention will dramatically increase the number of investors in the music and video marketplace.

The present invention may also provide a new source of revenue for retired performers or artists. For example, suppose a professor of music or former performer (even a Grammy award winner) now overlooked, were paid by an investor to critique a particular piece of art, causing its value to increase, creating "scores". In that case, a former active artist may now cash in on his or her reputation by backing new aspiring artists in the marketplace according to the present invention. Obviously, in time, the public or other users of the marketplace according to the present invention will observe the work of critics within the marketplace (paid and unpaid) and critics who issue paid biased critiques will be exposed and discredited, as opposed to those who render accurate and unbiased critiques. In much the same, the Gemological Institute of America grades diamonds or stones as to clarity, cut, carat weight and color. The ratings obtained help set market value, and in turn, according to the present invention, the role of the critic (paid or unpaid or sponsored) will help set a market value for copyrightable works of art. Copyrightable works of art according to the present invention may include music, video, movies, radio or podcasts, images, books, magazines or any other copyrightable works of art. It is a primary object of the present invention to establish a market for works of art, by increasing the number of participants in the relevant industries and thus minimizing the occurrence of the "undiscovered artist". In an era of social media, the role of social media influencers is enormous, and so, there is no reason why truly gifted artists need to wait to be "discovered" by an A & R person working for a record company; with the present invention, artists may join the community according to the present invention, apply for and obtain copyright protection, market their creations or collaborate with other present or historic artists to create compilations or derivative works, find investors who wish to either invest in single artists or pools of artists (securitized pools of artists), invest in critics who will author reviews, with pricing of critic reviews fair market driven based on the demand that certain critics can support based on their standing with the pertinent artistic community or their own credibility as a critic, and ultimately catch the attention of the general public directly or by way of traditional A & R at the record companies. Of course, this process may be carried out with respect to all forms of copyrightable art.

Faculty at universities or even faculty members according to an educational feature according to the present invention will offer live classes online as to how best to utilize the present invention for their own goals. Courses may be paid for by subscription or one at a time, either with money or by credits earned by selling and brokering art via the present invention. That is, a sort of credit or currency may be developed within the present invention to alleviate problems involved with foreign exchange.

According to the present invention, every copyright creator or author may use or participate within the marketplace. The artist may be creating software, video games, books, music, videos, and so forth. Automatic downloads may be obtained from Garage Band, Mixcraft, Music Maker Jam, Stagelight, FL Studio, Reaper, iMovie, Final Cut Pro, MacX Video Converter Pro, Logic Pro, Pro Tools, Adobe Premier Pro, VideoLAN Movie Creator, Microsoft Word, and indeed, three dimensional ("3D") art may be even be protected and marketed according to the present invention. Paintings and sculptures may be imaged and downloaded into the marketplace, and a member will register with all of his or her personal and when applicable, company data. Membership registration may also include a payment mechanism including credit cards, PayPal, Apple Pay and other forms of electronic payment. Via one portal feature of the present invention, the Library of Congress may be access to actually obtain a copyright registration of each author's created work of art. Of course, an independent registrar may be developed with lockbox technology, to accurately identify the true author of a copyrightable work of art, including music and videos.

Once registered, the registration right, title and interest may be recorded in the Library of Congress or with any other national, international or private repository. In order to secure registration, the present invention will verify fixation, originality and that minimal creativity has been achieved. Once an author has secured and recorded his or her or company authorship, exclusive rights to reproduce the work will be granted, along with the exclusive right to preclude derivative materials from being created and finally, the grant of the exclusive right to distribute and or produce copies. True copyright ownership and benefits may be distributed to the masses. While other portals like Legal Zoom and the Library of Congress have some of these capabilities, they stop at the registration and recording as to title; none completes the marketplace according to the present invention whereby exclusive rights are secured or if exclusive rights were independently established, authors or creators of art may market and collaborate and get paid for their works of art. And, critics and investors of and in art may participate for their own benefit, which in turns benefits creative art across the globe.

A copyrightable work is assigned to an owner, that owner may market it within the marketplace according to the present invention. In short, the marketplace will consist of buyers and sellers who will each create a profile. Buyers may or may not be sorted as to regions, fields of interest, categories or various stores. Sellers as well. For example, suppose Kanye West wanted to sell "beats", he could market them for free to multiple students, charging more for non-students, but in all cases, the use of his "beats", copyrighted and owned by him, could generate music royalties in the future by way of a derivative work. In essence, a multitude of people in the marketplace will have the opportunity to download Kanye's beat onto a music creating program of their liking and build their own song on top of the beat. The division of copyright royalties is well-known in the music industry, and the concept of bidding with a bidding process, and an end to it, well established for merchandise by Ebay. The copyright marketplace will set the winner, and the copyright marketplace will notify the seller and the buyer as to the successful bid. In turn, more buying and selling may continue, with the price reflecting supply and demand as to comparable pieces or copyrightable works or comps. The real estate market has always relied on comps, so the concept is well-known, just not in the music or video fields.

Various users or companies may track activity and calculate ratings by seller and buyer, much the way Moodys rates investments or bonds. The present invention features a capability that stores the users search queries and preferences in order to recommend similar content that might be of interest to the user. The marketplace sets the value so that artists get fair market value for their creations, and are able to reach a maximum number of interested parties or potential investors. In turn, more investors will be drawn to this sort of artistic investment due to its transparency, almost like a stock exchange. According to the present invention, a data and financial exchange may be constructed, integrating in well-known structures that up until now have never been tied together in the music industry. Instead, the A & R of record companies may rely on the present invention to drive more talent for them to review in order to optimize obtaining the best artists. Work for hire copyright arrangements were entered into investors may commission various artists to create a work of art. For example, Mozart was commissioned to create music, and in much the same way, the present invention may be used by starving artists in order to survive. In addition, subsequent copyright owners may buy and sell works of art, so that a true exchange is carried out according to the present invention, with an art "ticker" so to speak, with fluctuating values and futures.

Naturally, as with any marketplace, advertisers, brokers, legal practitioners, talent agencies, the public audience, colleges and universities and their personnel, independent brokers and investors, critics both independent or paid (or sponsored) and mass distribution agents such as cable, television, radio, and the record labels (via A & R) may participate actively in the marketplace according to the present invention.

In addition, according to the present invention, qualified market evaluations may influence the value of the art. Paid reviews may be obtained by copyright owners, wherein the fee for the review is based on the rankings and grades of the reviewers or critics and the history of the author and or copyright owner. Underwriting the price, so to speak. A roster of paid reviewers may be developed consisting of music faculty or other scholars of the relevant art, or even past performers or aware winners. Artists may obtain their own paid sponsors outside the marketplace and that sponsor (such as a car company) may back a particular artist. For example, in the 1950s it was common for television programming to be paid for by corporate sponsors. In the modern era, the role of social media influencers to drive sales of music cannot be overlooked, and the present invention for the first time establishes a way for a fair market value to be derived. Joint artists or contributors to a compilation or derivative work will not be overlooked and in that case royalties divided and the cost to promote shared, in a fair and equitable manner, based on rankings and so forth.

One of the options available to users of the present invention is the ability to purchase a music synchronization or "sync" license, whereby the copyright holder of a composition allows the licensee to use that composition within a visual medium such as film or television. When an artist makes a composition available for sync licensing within the marketplace of the present invention, an initial sale price for a specified use of the composition is determined at the point of sale, as well the option to earn backend royalties every time the composition airs. In this type of transaction conducted within the marketplace, the artist or copyright owner still retains the rights to the composition, however this also allows for the copyright owner to generate profit and promote the work. Sync licenses can also increase the awareness and demand for the work and increase value of that particular work within the marketplace. This is also advantageous to a potential buyer who may not want to pay the full price for ownership, but still have the right to use the composition in a collaborative media project.

According to the present invention, live venues may also use the present invention to book entertainment for their venues. It is well known that most performers make more money performing live than they do via media distribution. Venue owners may connect with emerging artists and book their venues. Established artists can use the present invention to fund their tours. For example, it is contemplated that major investors will monitor the marketplace according to the present invention, so that big events and long running events may be bid on by various venues, and in turn, various venues may compete for certain entertainment. It's simply an exchange, akin to a stock exchange. In addition, the present invention facilitates third party investment into touring acts. Presently, third party investment is often accomplished via word of mouth business contacts; with the present invention, investors may purchase in advance a percentage of a project, whether it be a tour, a movie, a television program, etc. Futures in media will for the first time be directly connected with the authors and owners of the art.

Users of the present invention can create playlists and then broadcast these playlists over a streaming radio mode. The playlist created within the present invention by the user is broadcast through other media such as podcasts, music streaming services such as Pandora or Spotify, and satellite radio. The playlist creator will then have to share royalty payments from the broadcast with the artists who created the content used. For the artist, this results in another channel of distribution for their content.

Four primary categories of marketplace user according to the present invention are influencers, buyers, sellers and bookers or brokers. Reviewers or critics may endorse or rate all four, and likewise, investors may invest in any of the four. An online learning feature will enable online classes with musicians, professors, artists and other performers. All learning is subject to a fee, except many classes may be sponsored by the established artists, out of a sense of civic well-being in order to give back to the community, but, may also attach a future shared royalty in the event some work generates substantial revenue. Even then, at any point, revenue may be dedicated to certain philanthropic causes.

The present invention works as an artist payment and contract negotiation facilitator, making the legal aspects of payment negotiation easier for even music industry outsiders by serving as the main negotiation platform. For example, if a member is looking in the marketplace for a score for their film, they would have to negotiate with each artist member individually, if the member decides to use works composed by multiple artists. The present invention can facilitate this by implementing an attorney and legal representative portal separate from artist members or A&R members.

If a company decides to sponsor an artist they find on the application marketplace, the division of the sponsorship payment would be negotiated through the application between the company and the artist. Artists that have multiple sponsors or patrons must negotiate terms individually with each sponsor member. If an artist posts a sponsorship request on the marketplace, they can also set what each sponsor would get based on various amounts, in order to facilitate sponsorship. If a third party, such as an A&R rep, finds an artist on the application marketplace for a corporate sponsor opportunity, the A&R (or other third party) member would be included in payment negotiations, depending on payment via percentage points or a commission fee. Each member plays an active role in all payment and contract negotiations, on a case by case basis, for any monetary transaction done through the electronic marketplace.

The present invention also implements a shopping cart interface within the electronic marketplace to facilitate the purchase of creative works, including but not limited to digitized music files, for buyer members. A buyer can browse the electronic marketplace and add creative works to the shopping cart, whereby the shopping cart is automatically updated to reflect the accumulated total cost of the creative works added. Once the buyer is finished browsing the marketplace, the buyer can proceed to checkout by confirming the payment information stored on their account and completing the purchase of the creative works. This allows for the buyer member to easily purchase a creative work instantly, with a variety of established pricing structures pre-set by the artist or artist representative, such as the artist's manager or legal representative. regarding whether the work is purchased for personal use only or if the buyer wants to buy licensing rights to use the creative work in commerce. If the creative work consists of, for example, a digitized music music compilation consisting a plurality of contributing artists, the funds made from the sale of the creative work will be split in proportion to each individual artist's contribution to the work. All contributing artists must agree to the payment split rates before the work is made available for sale on the electronic marketplace. However, all payment negotiations can vary for each individual artist on a case by case basis.

These and other features, embodiments, and aspects of the present invention can be appreciated from the following drawing description and detailed description of a preferred embodiment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE DRAWINGS

Figure 1:
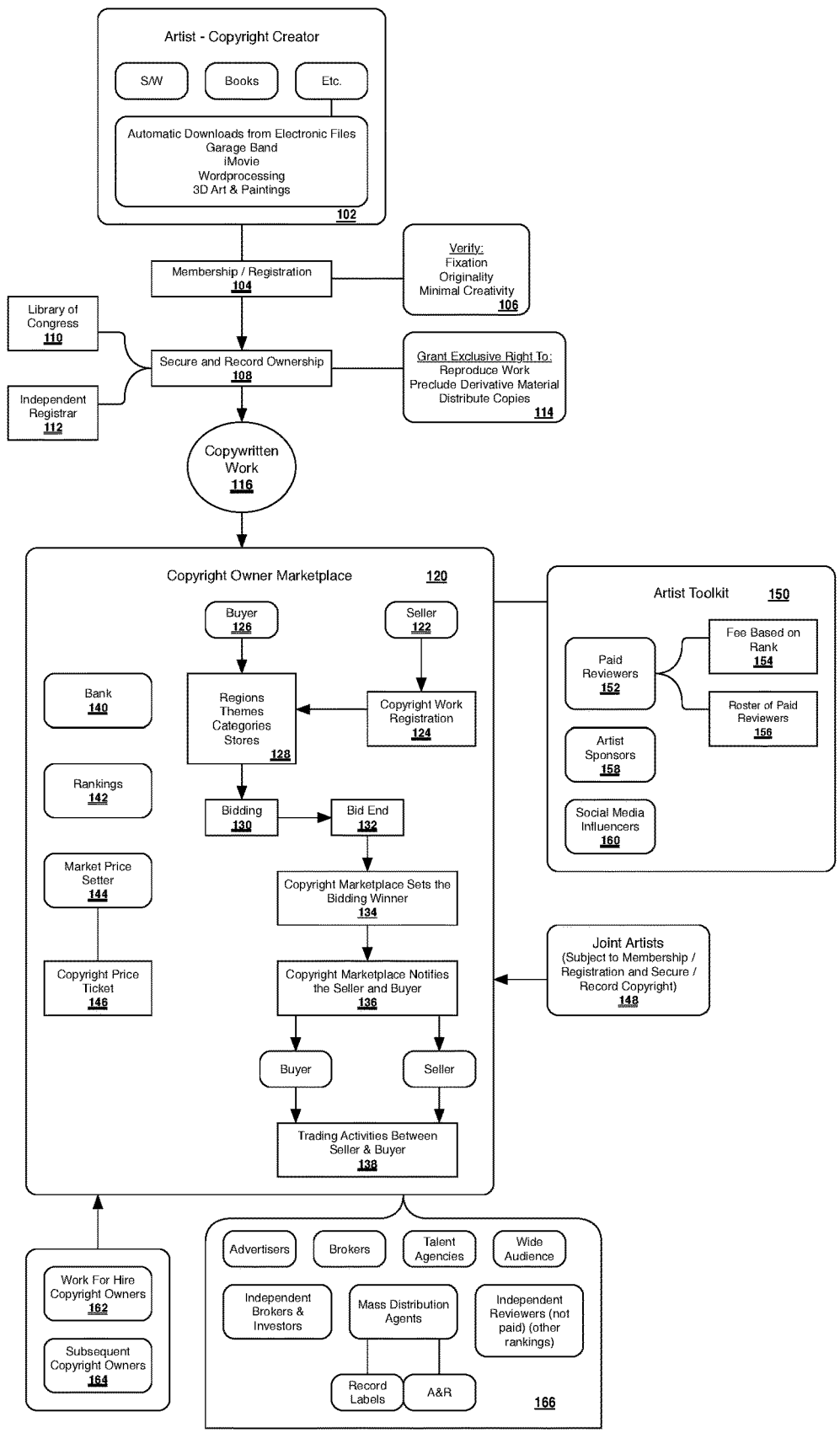
FIG. 1 is an overall view of the present invention.

FIG. 1 is an overall view of the present invention. According to the present invention, the artist or copyright owner 102 of original content can upload and manage a creative work within a marketplace 120 that facilitates the sale and distribution of content by allowing various users to access the work and providing a series of system features and data aggregation that can promote the marketing, distribution and sale of said work. A user who is a content creator or has ownership of content that includes but is not limited to music, film, written material or art can register within the present invention as an Artist 102 by entering specified data into the membership/registration 104 interface. The user can automatically download their work as an electronic file from various computer based content creation applications. The data entered by the user is then analyzed and verified 106 for fixation, originality and minimal creativity of the registered user to confirm that the user has ownership of original content. The user can also secure and record ownership 108 of uploaded original content through the present invention by having access to the Library of Congress 110 and an independent registrar 112. The present invention facilitates the process of copyright ownership of an original creative work by guiding the user through various specifications outlined by the copyright office. By securing copyright ownership to an original creative work, the Artist is granted the exclusive right to reproduce the work, produce derivative material and distribute copies of the work 114. Once the Artist has been verified and has obtained a record of ownership, the copy written work 116 can be made available on the content marketplace 120 to be viewed by other members of the present invention. The content or copyright owner marketplace 120 is used as a means of sharing, displaying, and distributing creative content. The artist or copyright owner 102 can also act as the seller 122 of the creative content they have previously uploaded. The seller 122 function allows the artist or copyright owner 102 to solicit the sale content through various means including but not limited to content distribution, licensing, and full or partial content ownership. The copyright registration 124 is posted as being for sale, available to be purchased by users of the present invention who have registered as buyer 126 account members. When the seller 122 posts that a work that they have ownership of is for sale, the seller 122 sets relevant filtering parameters 128 such as: geographical regions where ownership is valid and distribution is permitted; specifying themes within the creative content that are set as search word parameters for potential buyers 126; placing the work in particular categories; and specifying the virtual "stores" within the marketplace will serve as the access point to the buyers 126. The marketplace uses different ranking 142 algorithms to determine the value and demand for the creative work, and the seller 122 can utilize the market price setter tool 144 to help determine starting bids and copyright ticket price 146 values for their creative work. Buyers 126 can then start placing bids 130 within the marketplace, and the bid effectively ends 132 in an allotted period of time. The marketplace function of the present invention determines the winning bid 134 and a message is sent out 136 through the messaging interface within the present invention to notify both the seller 122 and the buyer 126 of the transaction. By agreeing to the terms of service of using the marketplace function of the present invention, the seller and buyer conclude the marketplace transaction through previously stipulated trading activities 138. The marketplace feature then completes an e-commerce transaction using secure and encrypted connections to the external bank 140 account servers both the buyer 126 and the seller 122. Depending on the ownership of the creative work, there can be multiple sellers or buyers within one transaction. Joint artists 148, subject to account membership registration and copyright record ownership, can profit from the sale of a creative work or buy into a partial ownership of the work within the marketplace 120. All artists or copyright owners have access to the artist toolkit feature 150 within the present invention. This toolkit allows artists and copyright owners to increase the ranking and bidding price of their work through functions such as: obtaining paid reviews 152 of the creative work from a roster 156 of verified reviewer account holders 152 who negotiate their reviewer fee based on a credibility and influence based ranking system 154; obtaining sponsors 158 who are given incentives by the artist or copyright owners for providing funding; and access to social media influencers 160 that help promote the creative content within vast networks. The marketplace 120 feature within the present invention also connects artists 102 with work for hire copyright owners 162, and subsequent copyright owners 164, to whom copyright ownership of the creative work is transferred to. A key aspect of the marketplace embodiment within the present invention is that the marketplace serves as a means of connecting the artist or copyright owner to a network of mass distribution agents 166. These mass distribution agents include but are not limited to: advertisers; brokers; talent agencies; independent brokers and investors; record labels; artist and repertoire ("A&R") divisions; independent reviewers and a wide audience culminating in an increase of exposure for a creative work.

Figure 2:
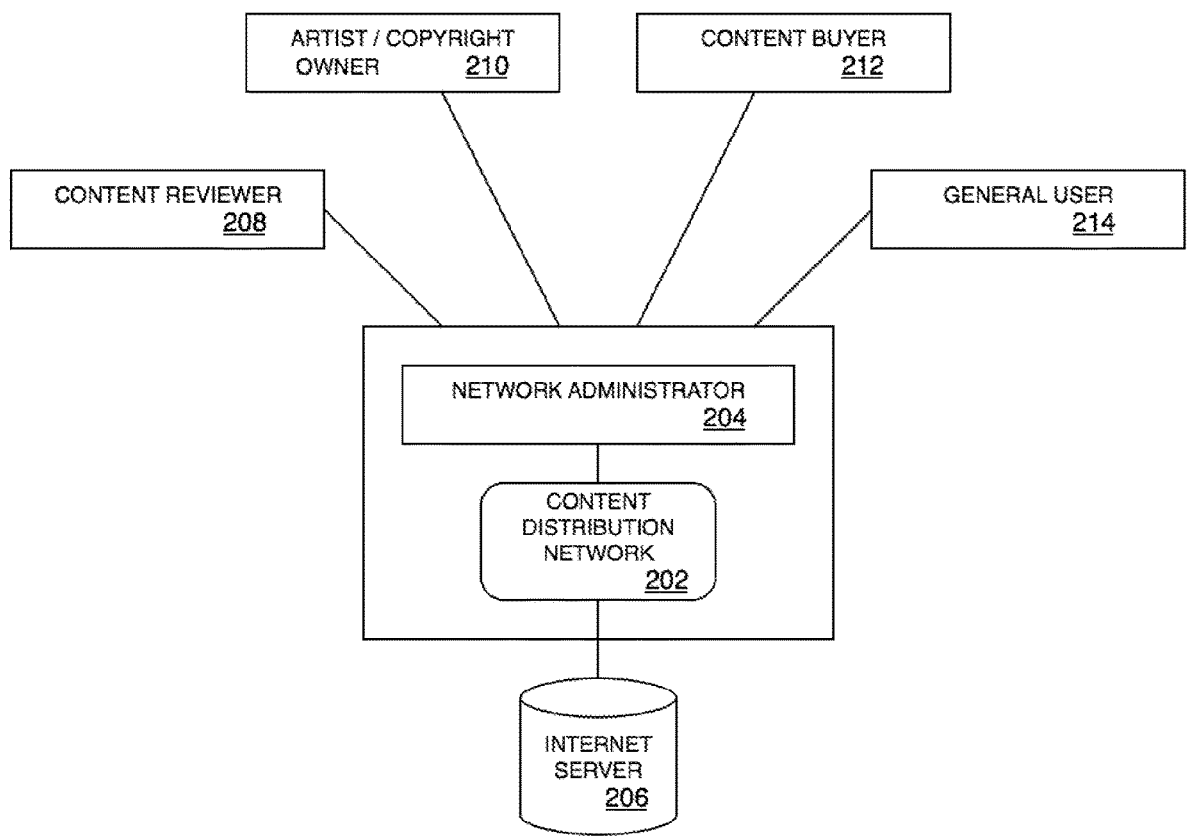
FIG. 2 is a block diagram, which describes different user profile options in relation to the administrator function of the present invention.

FIG. 2 is a block diagram, which describes the different user profile options in relation to the administrator function of the present invention. In accordance with the preferred embodiment of the present invention, the Network Administrator 204 access interface is connected directly to the Content Distribution Network 202, that is linked to the internet server 206. The Network Administrator 204 has administrative access to all types of user profiles that are registered within the Content Distribution Network 202. The Content Reviewer 208 account profile is designated for verified users that seek to review content uploaded to the Content Distribution Network 202. The Artist/Copyright Owner 210 account profile is designated for verified users that upload content that they hold copyright ownership of, or wish to obtain copyright ownership of original work, on to the Content Distribution Network 202. The Content Buyer 212 account profile is designated for verified users that wish to purchase rights or licensing opportunities for works uploaded to the Content Distribution Network 202 by the Artist or Copyright Owner 210. The General User 214 account profile is designated for all other users that wish to participate in the Content Distribution Network 202, however the General User 214 account profile is not permitted to upload content or engage in purchasing content rights within the Content Distribution Network 202.

Figure 3:
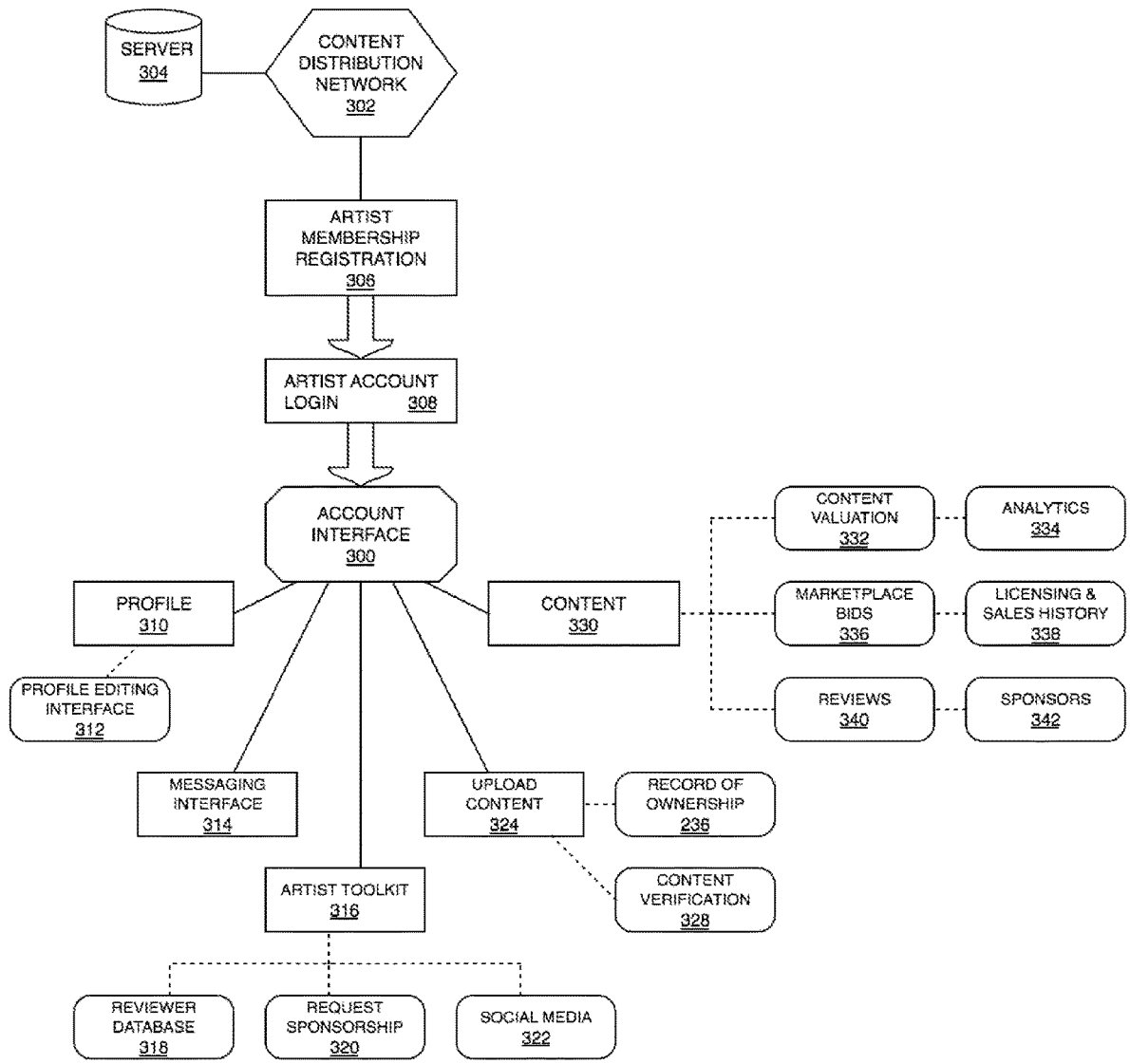
FIG. 3 is a block diagram, which details the artist profile account interface.

FIG. 3 is a block diagram, which details the artist profile account interface. In accordance with the preferred embodiment of the present invention, the artist profile account interface 300 is accessed within the Content Distribution Network 302, on which all data is stored on a server 304. The artist profile account interface 300 requires the user to first register for membership by inputting data on the artist membership registration function 306 on the Content Distribution Network 302. Once registration is complete, the user is then able to access the account interface 300 through the artist account login 308 function by entering username and password verification data. The account interface 300 allows the user to view their profile 310 and edit profile information within the profile editing interface 312. The user can also access a messaging interface 314 that facilitates and stores all communication between the user and other users of the Content Distribution Network 302. With the in account interface 300, the user can access the Artist Toolkit 316 that is only with an artist account membership. The Artist Toolkit 316 provides access to the reviewer database 318 whereby the user can browse through reviewer member profiles and communicate with reviewers regarding content uploaded by the user. The Artist Toolkit 316 also allows for the user to request sponsorship 320 by posting requests that are viewed by all users of the present invention. Users that also link external social media profiles to their profile can use the social media 322 function on the Artist Toolkit 316 to increase influence and outreach within the present invention. The artist account interface 300 allows the user to upload content 324 to the Content Distribution Network, whereby the user can obtain a record of ownership 326 for the uploaded content and verify ownership and copyright through content verification 328. The user uses the account interface 300 to view and manage all uploaded content 330. The content management capabilities of the present invention include data algorithms that calculate content valuation 332 and analytics 334 that are based on specific factors designated by the Content Distribution Network 302. The user can make uploaded content 330 available on the marketplace bids 336 database and access licensing and sales history 338 for uploaded content. Reviews 340 and Sponsors 342 for uploaded content are linked to the content and can be viewed and managed by the user.

Figure 4:
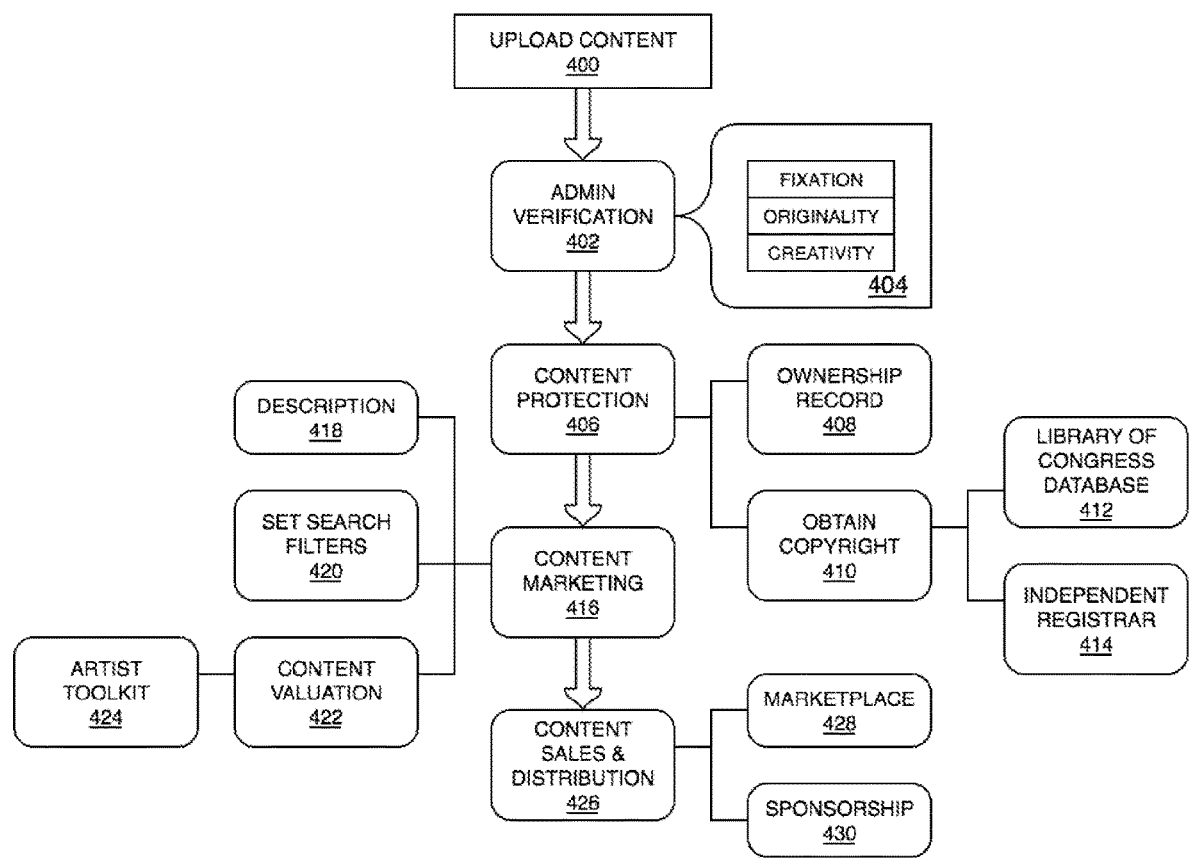
FIG. 4 is a block diagram, which describes the process of uploading content and content related options within the present invention.

FIG. 4 is a block diagram, which describes the process of uploading content and content related options within the present invention. In accordance with the preferred embodiment of the present invention, a user with a registered Artist membership account can upload content 400 to the content database within the present invention. Content is uploaded from the user's external server to the admin verification 402 database within the present invention. All uploaded content is approved within admin verification 402 to confirm that the uploaded content fulfills the criteria of fixation, originality and creativity 404 specified by the verification algorithms of the present invention. Once content has been verified, the user can view options for content protection 406. The user can upload an existing ownership record 408 or obtain copyright 410 for the uploaded content by having access to the Library of Congress Database 412 and independent registrar 414 services. The user is then able to use the content marketing 416 function to input a description 418 of the content, set search filters 420 for the content database, and view the content valuation 422 data that is stored and accessed by the user within the Artist Toolkit 424. The content marketing 416 interface allows the user to utilize the content sales and distribution 426 feature within the present invention. Content sales and distribution 426 is comprised of the Marketplace 428, where content is posted for sale, and sponsorship 430, where the user can request funding for creative projects and use current uploaded content to obtain funding in exchange for specified incentives with other users.

Figure 5:
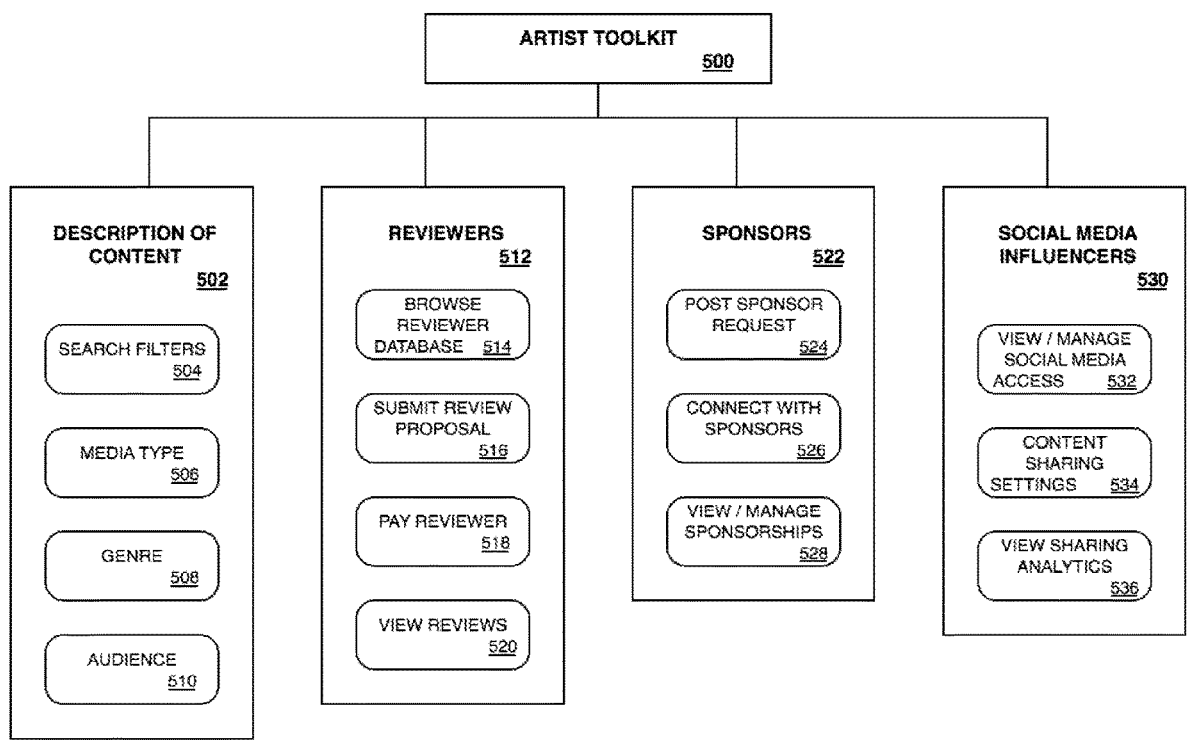
FIG. 5 is a block diagram, which details the artist toolkit available within the artist profile within the present invention.

FIG. 5 is a block diagram, which details the artist toolkit available within the artist profile within the present invention. In accordance with the preferred embodiment of the present invention, the Artist Toolkit 500 is a feature that is used within the Artist/Copyright Owner profile interface to manage content uploaded to the Content Distribution Network. When content is uploaded, the user can edit the Description of the Content 502 within the Artist Toolkit 500. The user can set specified Search Filters 503 that are applied to the search function capabilities within the content database. The user can also specify the Media Type 506 of the content that will also be specified within the search parameters of the Content Database, such as whether the uploaded content is a song, a video, a visual art medium, a design, or a written work. The user can also specify the appropriate Genre 508 of the uploaded content that can be used as a search parameter within the content database, dependent on the specified Media Type 506. The user can also set parameters for the intended Audience 510 for the uploaded content, setting permissions for whether it can be accessed by all users, or limited to reviewers or content buyers. The Artist Toolkit 500 also allows the Artist/Copyright Owner user to manage Reviewer 512 options for uploaded content. The user has the option to Browse the Reviewer Database 514 to search for reviewers and Submit Reviewer Proposals 516 to review the user's uploaded content. The User can use the Reviewer 512 module in the Artist Toolkit 500 to Pay a Reviewer 518 for a submitted review of the uploaded content and view all reviews 520 that have been submitted. The sponsors module 522 allows the user to obtain funding from other users by posting for sponsor requests 524, connecting with potential sponsors 526 and viewing or managing current sponsorships 528. The Artist Toolkit 500 also features the social media influencers 530 module. The user can view and manage social media access 532 that is integrated with the user's profile, and increasing the influence and outreach of the user within the content distribution network by acting as a marketing function for user content and being implemented into the content valuation algorithm of the present invention. The user can view and manage content sharing settings 534 between the linked external social media accounts and the present invention. Social media data stored in the social media influencers 530 module is accessed when the user selects to view sharing analytics 536, whereby data is processed and analyzed to provide the user with a visual report of how uploaded content is shared on connected social networks and how this data affects the valuation of content and influence of the user within the overall scope of the Content Distribution Network.

Figure 6:
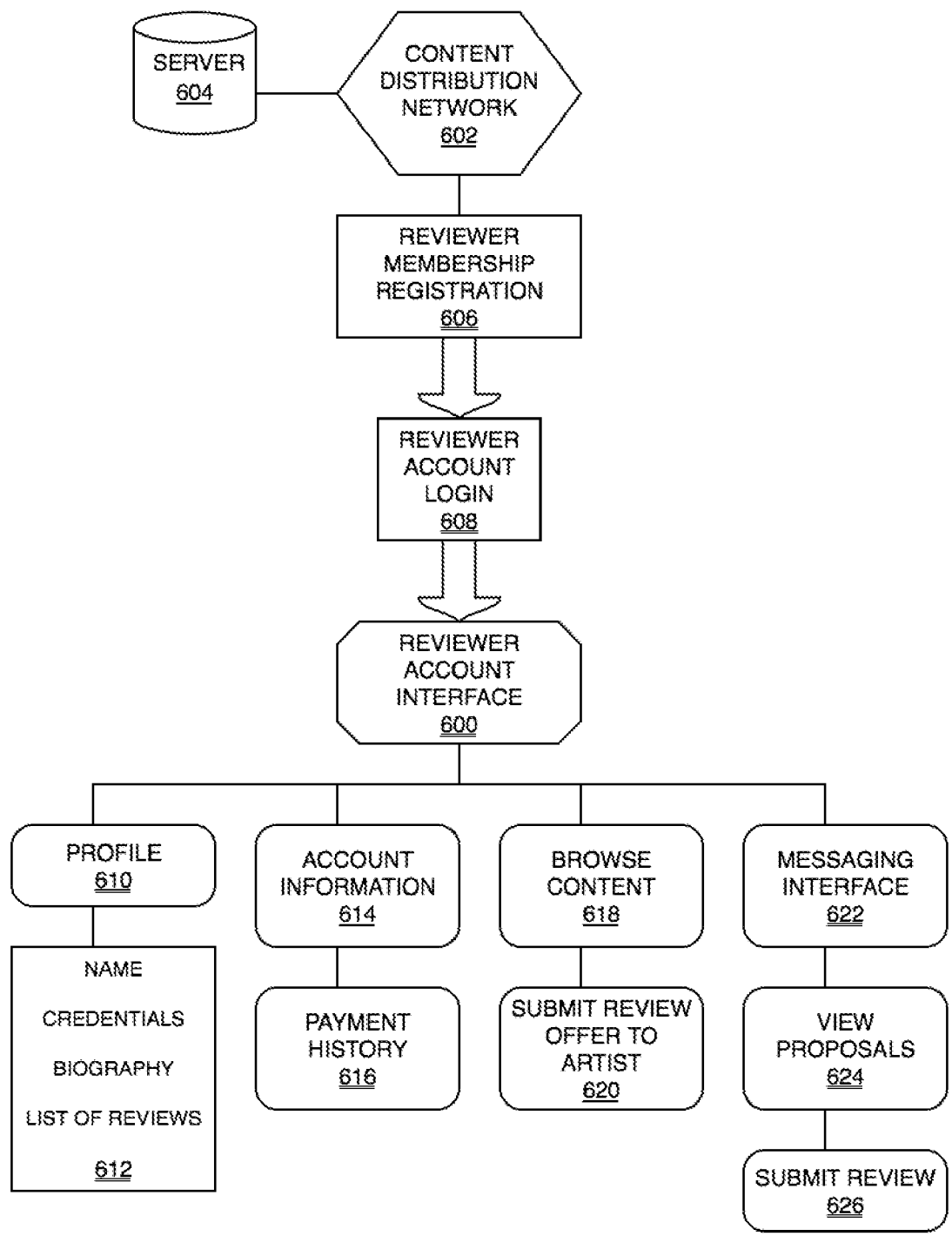
FIG. 6 is a block diagram, which details the reviewer profile account interface.

FIG. 6 is a block diagram, which details the reviewer profile account interface. In accordance with the preferred embodiment of the present invention, the reviewer account interface 600 is accessed within the Content Distribution Network 602, on which all data is stored on a server 604. The reviewer profile account interface 600 requires the user to first register for membership by inputting data on the reviewer membership registration function 606 on the Content Distribution Network 602. Once registration is complete, the user is then able to access the account interface 600 through the reviewer account login 608 function by entering username and password verification data. The account interface 600 allows the user to view their profile 610 and edit profile information within the profile editing interface 612, including the user's display name, reviewer credentials, biography information and a complete list of all reviews previously submitted by the reviewer within the present invention. The user can view and manage account information 614 pertaining to external bank accounts belonging to the user, and access a record of payment history 616 stored within the present invention that lists reviewer transactions from Artist members who commissioned reviews from the user in exchange for compensation. Reviewer account membership allows the user to browse content 618 uploaded by Artist members that are stored on the content database of the Content Distribution Network 602. The user can submit review offers to Artist members 620 from the content database. The user can access the messaging interface 622 within the reviewer account interface 600 that facilitates and stores all communication between the user and other users of the Content Distribution Network 602. The messaging interface allows the user to view proposals 624 submitted to and requested by artist members for uploaded content from the content database. Once an agreement between the reviewer and the artist has been finalized, the user can submit a review 626 of the content through the messaging interface 622.

Figure 7:
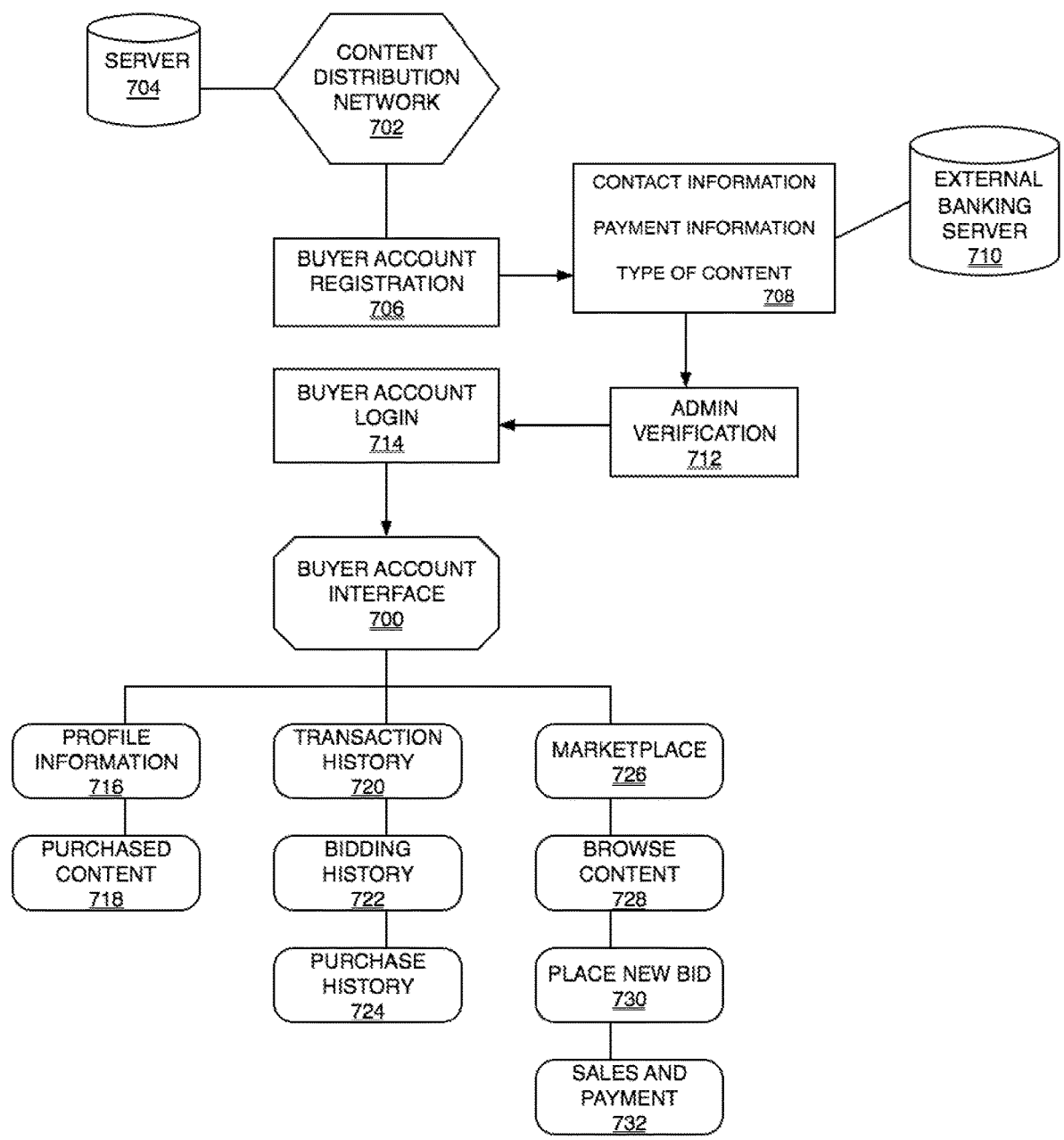
FIG. 7 is a block diagram, which details the buyer profile account registration process and interface.

FIG. 7 is a block diagram, which details the buyer profile account registration process and interface. In accordance with the preferred embodiment of the present invention, the buyer account interface 700 is accessed within the Content Distribution Network 702, on which all data is stored on a server 704. The reviewer profile account interface 700 requires the user to first register for membership by inputting data on the reviewer membership registration function 706 on the Content Distribution Network 702. The user is required to enter contact information as well as bank account information and the primary type of creative content that the user is interested in purchasing 708. The bank account data 708 input is then linked to the user's external banking server 710. The user registration data 708 is then verified through the administrator 712, and once all data has been verified, the user is granted access to login as a buyer through the buyer account login 714 function, entering a username and password verification data. After successfully logging in, the user has accessed the buyer account interface 700, that allows for the user to oversee and manage all account activity within the Content Distribution Network 702. The user can view and edit profile information within the profile function 716, as well as the ability to view a library of all purchased content 718 from the content marketplace 726. Within the buyer account interface 700 the user can also access the transaction history 720 module that includes the user's bidding history 722 as well as the user's content purchase history 724 from the content marketplace 726. The buyer account interface 700 allows for the user to access the content marketplace 726 in order to browse content 728 uploaded by artist account members. If the user finds content that they wish to purchase, the user can place a new bid 730 for the content from within the content marketplace 726. If the bid is accepted by the artist content owner, the user then completes the transaction with the sales and payment function 732 by verifying the sale amount, verifying bank account information and accepting all terms and conditions.

Figure 8:
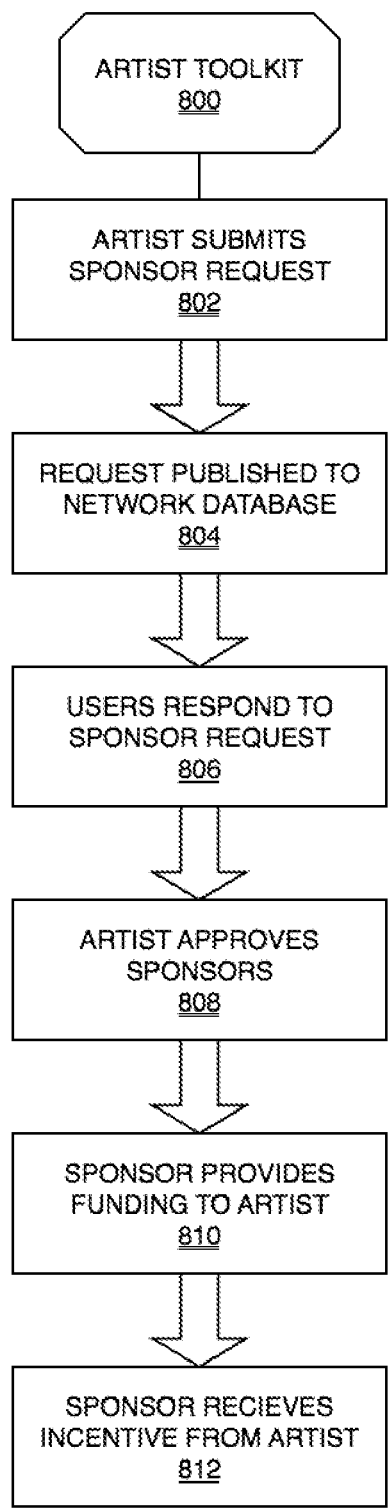
FIG. 8 is a block diagram, which describes the sponsorship feature within the present invention.

FIG. 8 is a block diagram, which describes the sponsorship feature within the present invention. In accordance with the preferred embodiment of the present invention, an artist account member can obtain funding for a proposed project by requesting sponsorship from within the artist toolkit 800. After logging into the user's artist account, the user accesses the artist toolkit 800 and selects the option to submit a sponsor request 802. A sponsor request may also include that the artist is available for work for hire or artistic collaboration purposes, willing to be hired by sponsors to create an original work or artistic collaboration. After entering the necessary request data, the request is published to the network database 804 located within the overall content distribution network. Depending on the specifications entered by the artist account member in the sponsor request submission 802, the sponsorship request can be viewed by any registered user with an account or specific users registered under specified accounts. Once the sponsorship request is published and viewed on the database 804, other users within the content distribution network can respond to the sponsor request 806. The artist account member can then review the sponsorship submissions from other users from within the artist toolkit 800, and approve sponsors 808 based on criteria stipulated by the artist account member. By approving the sponsor request, the sponsor users provide funding to the artist user 810, and stipulated in the posted sponsorship request 802 and finalized in the sponsor review and approval 808 process. The sponsor then receives the incentives 812, or the final product that has resulted from a work for hire sponsorship arrangement, outlined by the artist user in the sponsorship request. These incentives serve as a motivational means to secure funding from sponsorship, and the incentive rewarded to the sponsor is decided by the artist user and proportionally based on the funding provided by the sponsoring user. If the artist and sponsor had agreed to the terms of a work for hire or collaboration work, the final result must satisfy the sponsors original terms.

Figure 9:
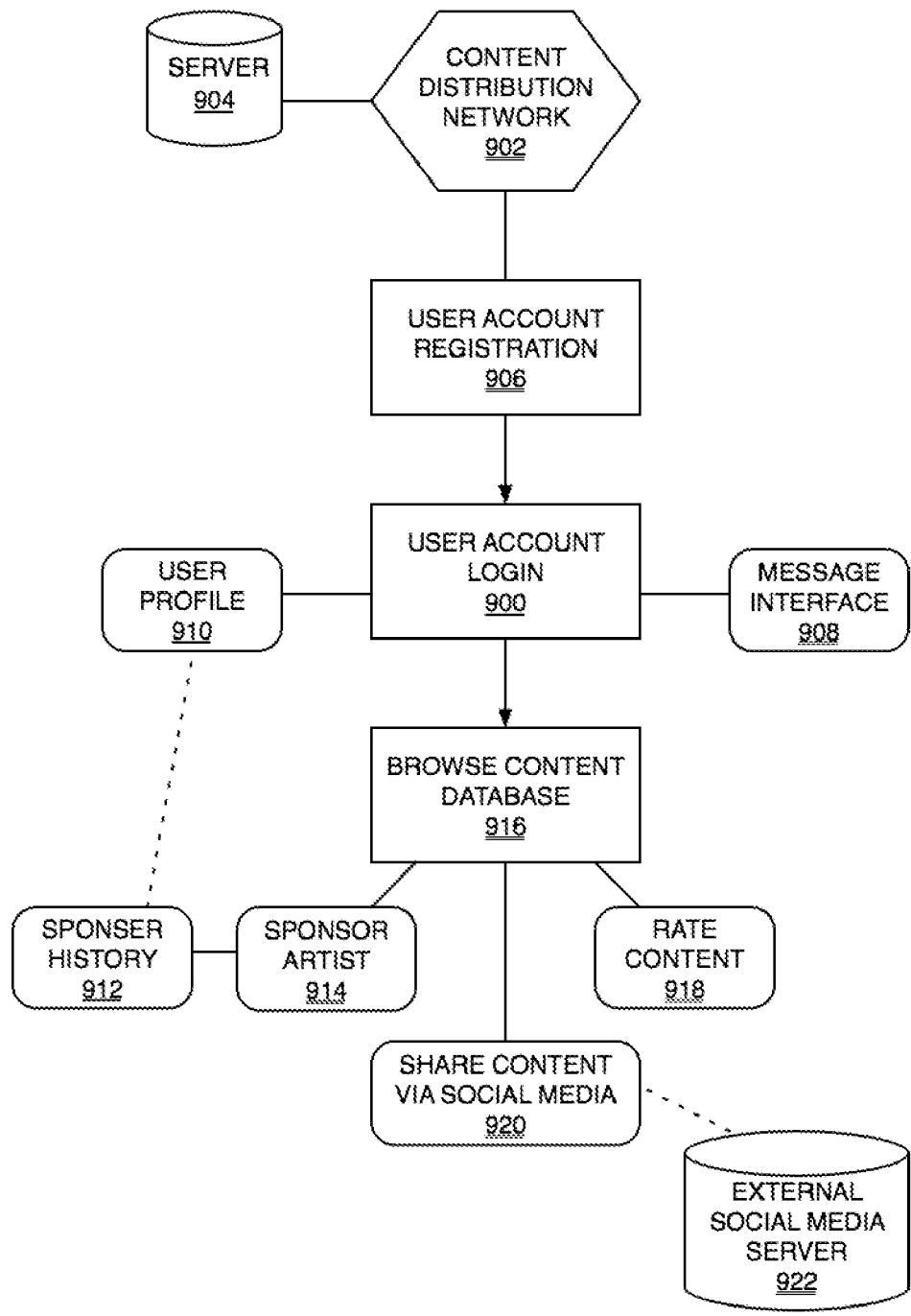
FIG. 9 is a block diagram, which details the user profile account registration process and interface.

FIG. 9 is a block diagram, which details the user profile account registration process and interface. In accordance with the preferred embodiment of the present invention, interested parties who do not meet the qualifications of an artist content owner, a reviewer or a buyer, have the ability to access the content distribution network 902 by registering for a general user account. Access to the initial registration process of the content distribution network 902, as well as all data within said network, is connected and stored on the system server 904. Within the user account registration function 906, the user enters the requested data and creates a user account login name and password. Once the user has verified the account, the registration process is complete and the user can access the content distribution network 902 by entering login information in the user account login module 900. Successful verification of the login data entered by the user then grants the user access to view and manage their user profile 910, browse the content database 916 within the content distribution network 902 and communicate with other users through the messaging interface 908. Within the user profile 910, the user can edit information and external social media data access. If the user sponsors an artist account member 914, the user is also able to view sponsorship history 912 within the user profile 910. The main feature of the user account is the ability to browse the content database 916 and view a variety of original media content uploaded by artist account members to the content distribution network 902. Through the content database 916, the user has the ability to view sponsorship requests submitted by artist account members and provide sponsorship 914. The user can also rate content 918 viewed within the database, whereby that rating will serve as a factor in determining the content's overall valuation. The user also has the ability to share certain content on the database to the user's social media account 920, linked to an external social media server 922.

Figure 10:
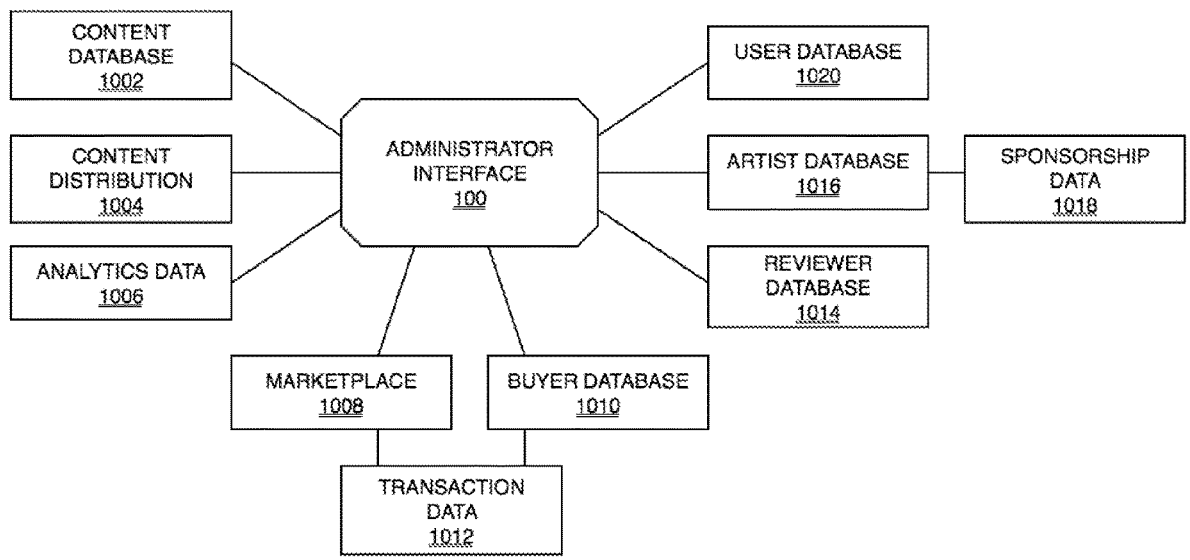
FIG. 10 is a block diagram, which describes the administrator interface of the present invention.

FIG. 10 is a block diagram, which describes the administrator interface 1000 of the present invention. In accordance with the preferred embodiment of the present invention, the administrator interface 1000 can access each module and database of the present invention in order to manage all aspects related to user accounts, aggregated data, uploaded content and transaction data within the Content Distribution Network. The administrator interface 1000 has administrative level access to the content database 1002, whereby the administrator manages and moderates all uploaded content to insure that all content fulfills the parameters specified in the user agreement of the Content Distribution Network. Administrative access to all aspects of content distribution 1004 allows for moderation and management of content distribution agreements between the artist and the content buyer. Content analytics data 1006 is managed through the administrator interface 1000, to insure accurate data aggregation and content valuation. The administrator interface manages the content marketplace 1008 as well as the buyer database 1010, as well as all transaction related data 1012 related to bids placed on content and all sales within the marketplace. The reviewer database 1014 is managed through the administrator interface 1000 to verify the account details of reviewers as well as moderate the content of submitted reviews. The artist database 1016 and all sponsorship data 1018 including requests, responses and the facilitation of funding to the artist and incentives for the sponsor is managed by the administrator interface 1000. Moderation and management of user accounts within the user database 1020 is accessed through the administrator interface 1020 to insure that all users within the content distribution network are complying with the agreed upon terms of service of the present invention.

Figure 11:
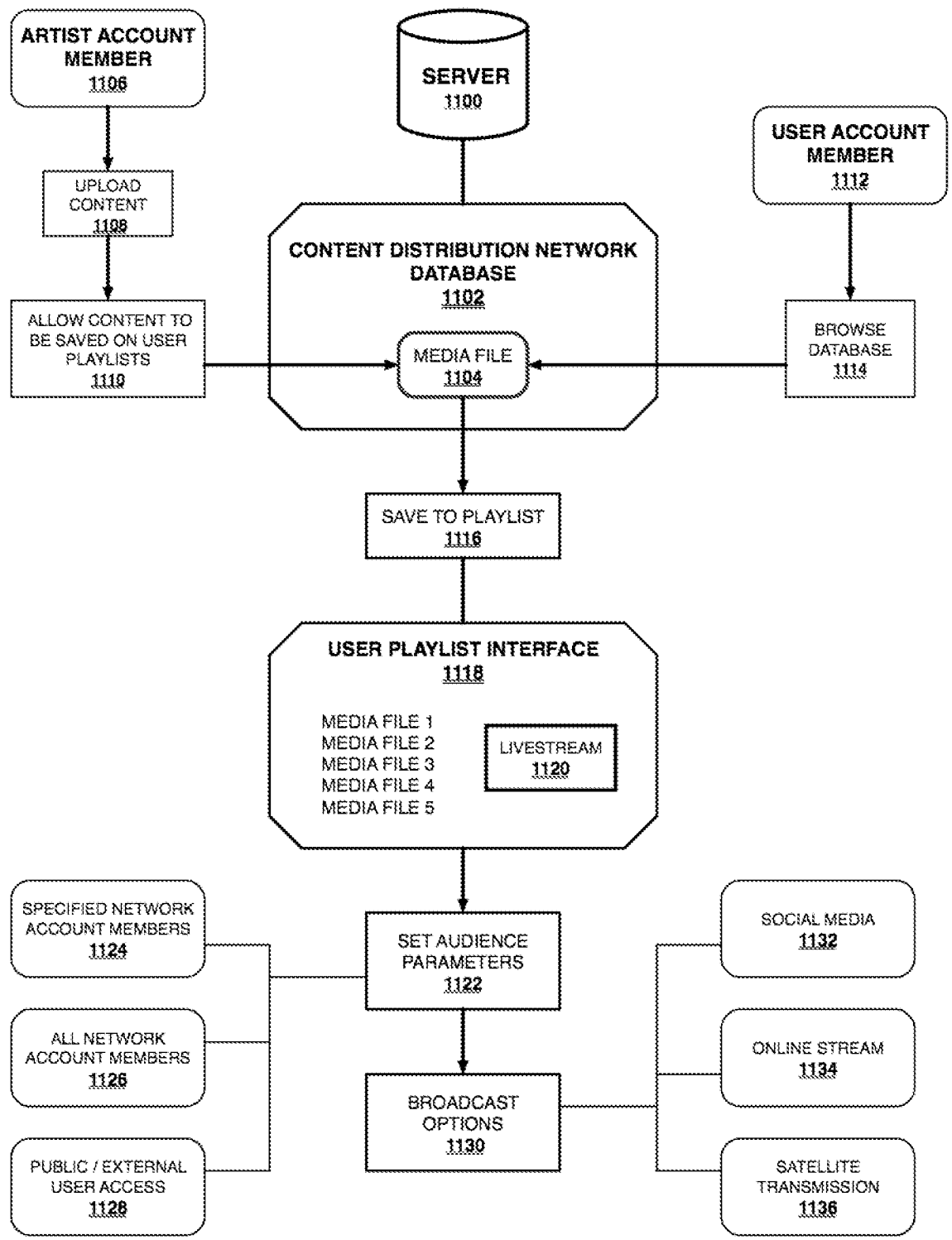
FIG. 11 is a block diagram, which describes the playlist live stream functionality within the present invention.

FIG. 11 is a block diagram, which describes the playlist live stream functionality within the present invention. In accordance with the preferred embodiment of the present invention, when an artist account member 1104 uploads original media content 1106 to the content distribution network, the artist member 1104 can select the option to allow the media file to be saved on user generated playlists 1110. Once the file has uploaded and stored within the content distribution network server 1100, the media file 1104 is made available on the content distribution network database 1102. A user account member 1112 can then access the media file 1104 by browsing through the content database 1114. The user account member 1112 is able to save the media file 1104 to a designated playlist 1116. All media files that the user account member 1112 saves to their playlists can be accessed within the user playlist interface 1118, where the user can elect to share a playlist with others by activating the live stream function 1120 within the playlist interface 1118. In order to live stream a selected playlist, the user can specify audience parameters 1122 and configure broadcast options 1130. Setting audience parameters 1122 allows the user to control audience accessibility through the following options: live stream access can be limited to a private audience of registered account members within the present invention that are invited by the user 1124; accessibility can be set to a semi-private option by allowing anyone who is a registered account member of the present invention to access the live stream 1126; and the public access option has no audience restrictions, by having the live stream available to everyone 1128. Once the audience parameters have been set, the user can select from broadcast options 1130 such as: live stream through the user's external social media accounts that feature or support streaming configurations 1132; live stream through the content distribution network online server 1134, using the streaming configurations within the present invention; and the option to connect the live stream through a satellite transmission network 1136 to be broadcast through specified satellite radio network channels.

Figure 12:
FIG. 12 is a rendering of the welcome screen of the mobile application.

FIG. 12 is a rendering of the welcome screen of the mobile application. In accordance with the preferred embodiment of the present invention, when the user opens the application on a mobile device, the welcome screen is displayed while the application is loading.

Figure 13:
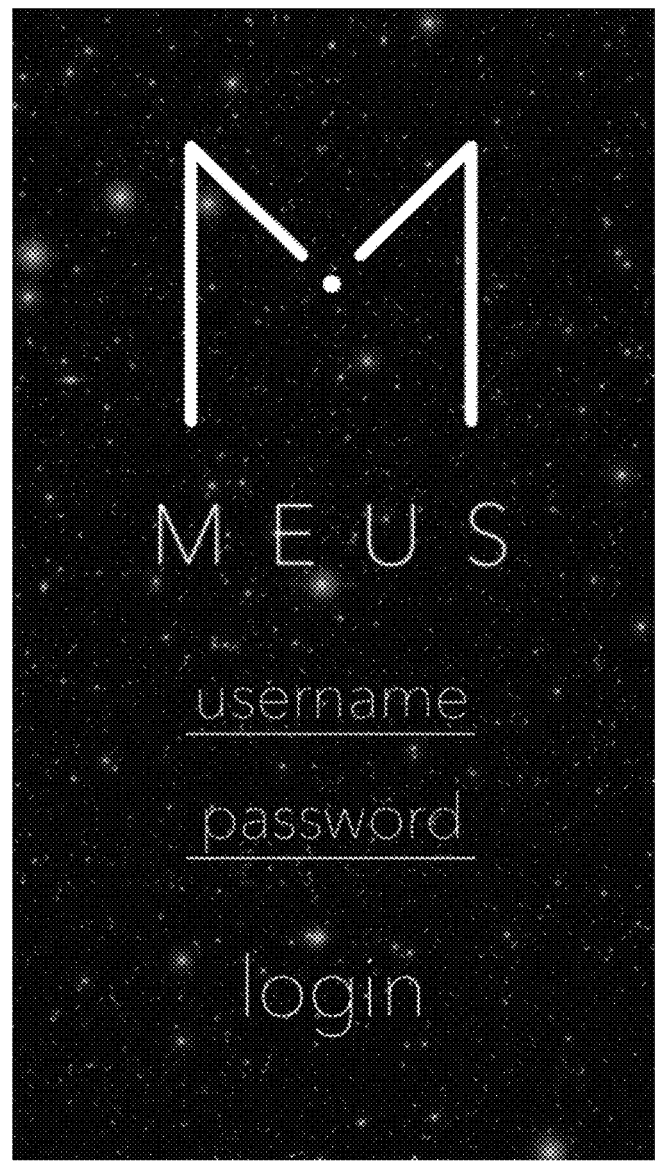
FIG. 13 is a rendering of the login screen of the mobile application.

FIG. 13 is a rendering of the login screen of the mobile application. In accordance with the preferred embodiment of the present invention, once the application has completed loading to the user's mobile device, a login screen interface is displayed which prompts the user to enter a previously registered username and password in order to gain access to the application.

Figure 14:
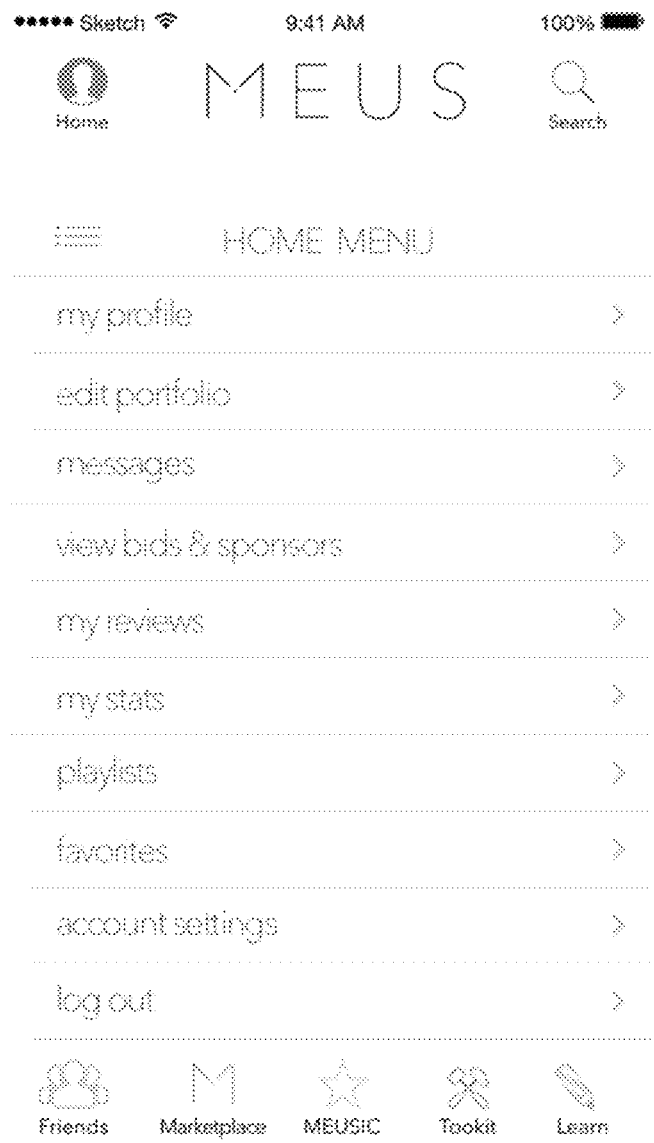
FIG. 14 is a rendering of the home menu screen of the mobile application.

FIG. 14 is a rendering of the home menu screen of the mobile application. In accordance with the preferred embodiment of the present invention, once the application user's username and password are correctly entered, secure access is granted to the user's home menu interface. The home menu interface provides access to functions such as: the user profile; user portfolio editor; messaging interface; bidding and sponsorship portal; user reviews history; user statistics analytics; user curated playlists; favorite artists; and the account settings portal.

Figure 15:
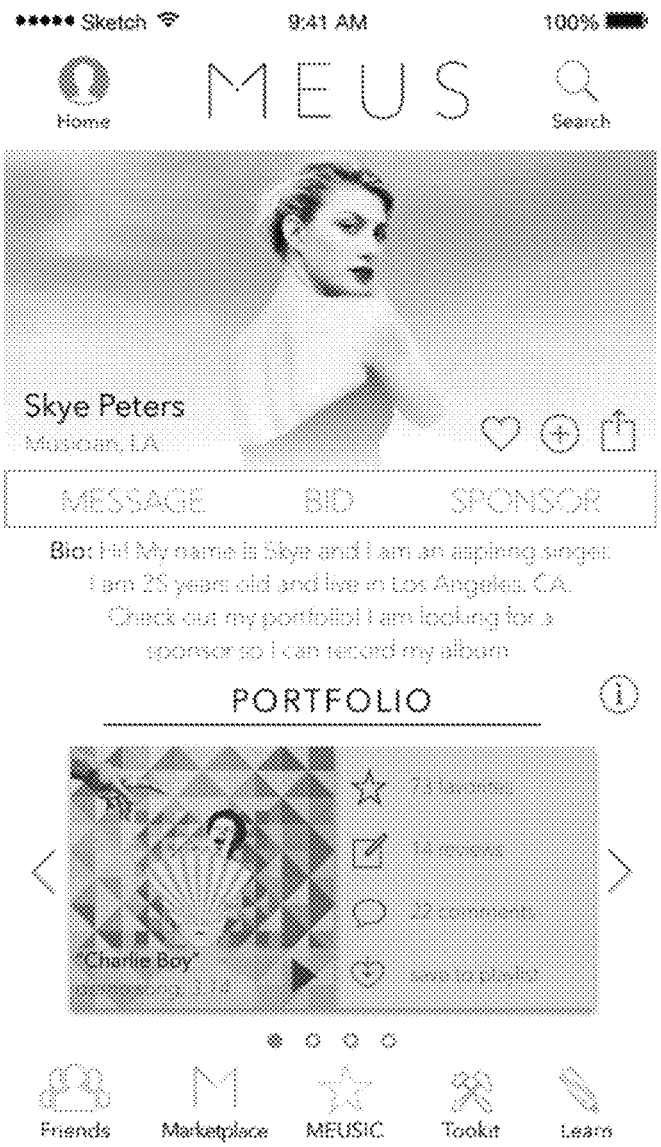
FIG. 15 is a rendering of the artist profile screen of the mobile application.

FIG. 15 is a rendering of the artist profile screen of the mobile application. In accordance with the preferred embodiment of the present invention, the user can access their artist profile through the home menu interface. An Artist's profile will be made to showcase a portfolio of their work. This will also include some personal information such as a profile picture, bio, age, location, school, accolades, etc. They may upload anything to their "online portfolio" for others to view. This includes songs or beats they have made, photography, paintings, sculptures, videos, writing samples, etc. Artists may customize their portfolio any way they see fit, and as soon as it's done, they are ready to enter the application marketplace. Within the account interface there will be many features, including but not limited to: Profile; Edit Profile; Messaging; View Content; Upload Content; and the application Toolkit.

Figure 16:
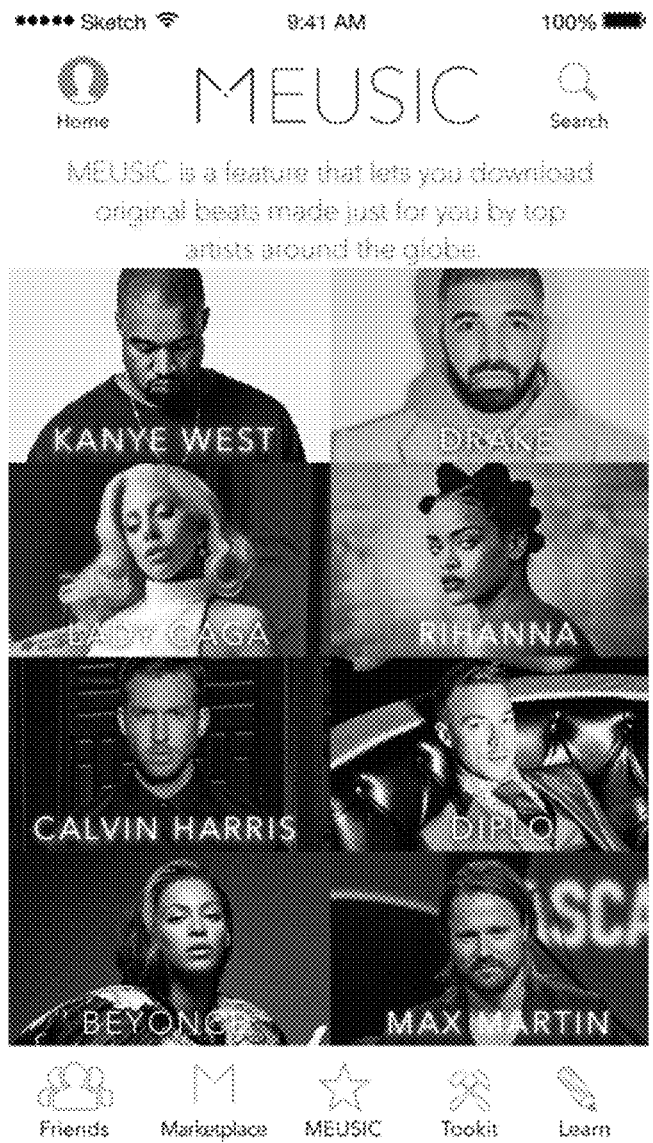
FIG. 16 is a rendering of the main home page of the mobile application.

FIG. 16 is a rendering of the main home page of the mobile application. In accordance with the preferred embodiment of the present invention, the main home page serves as a social media profile portal, featuring other application artist profiles on display for user access. The displayed artists can be generated at random, or filtered by ratings, genre, and user favorites. The main home page also features a search function allowing the user to search for another specified artist profile, or with broader search terms such as genre and keywords.

Figure 17:
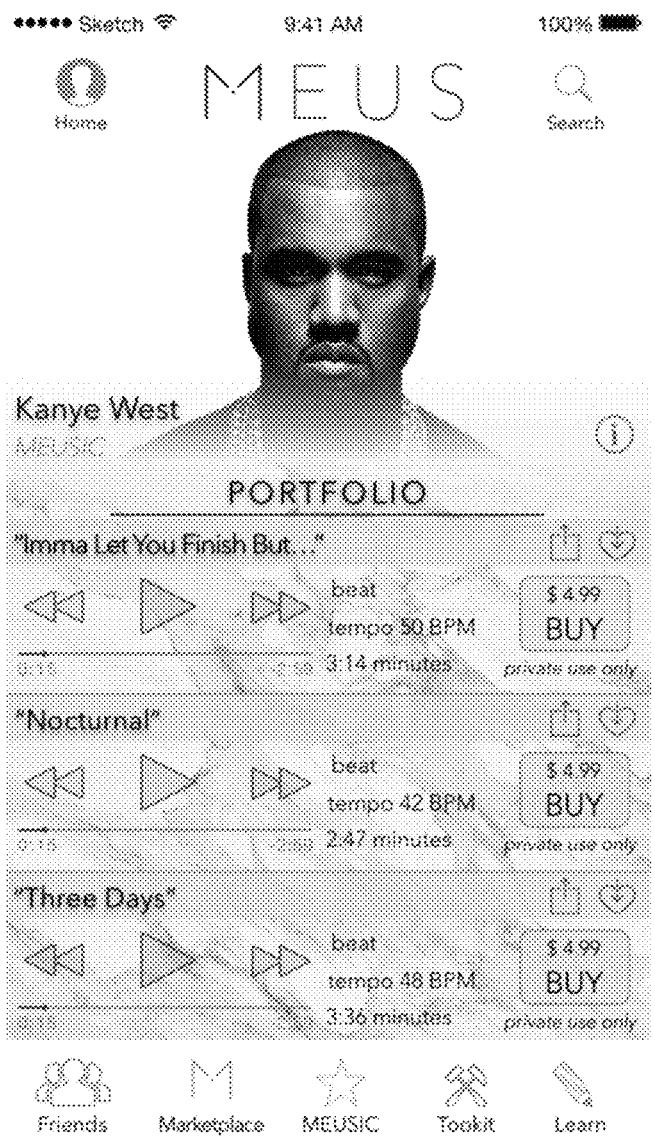
FIG. 17 is a rendering of an artist profile screen of the mobile application.

FIG. 17 is a rendering of an artist profile screen of the mobile application. In accordance with the preferred embodiment of the present invention, the electronic marketplace application will partner with various well known artists, music producers, and DJ's, where they will upload a series of original beats or synths to the marketplace, many completely exclusive to the application itself and its registered viewers.

Figure 18:
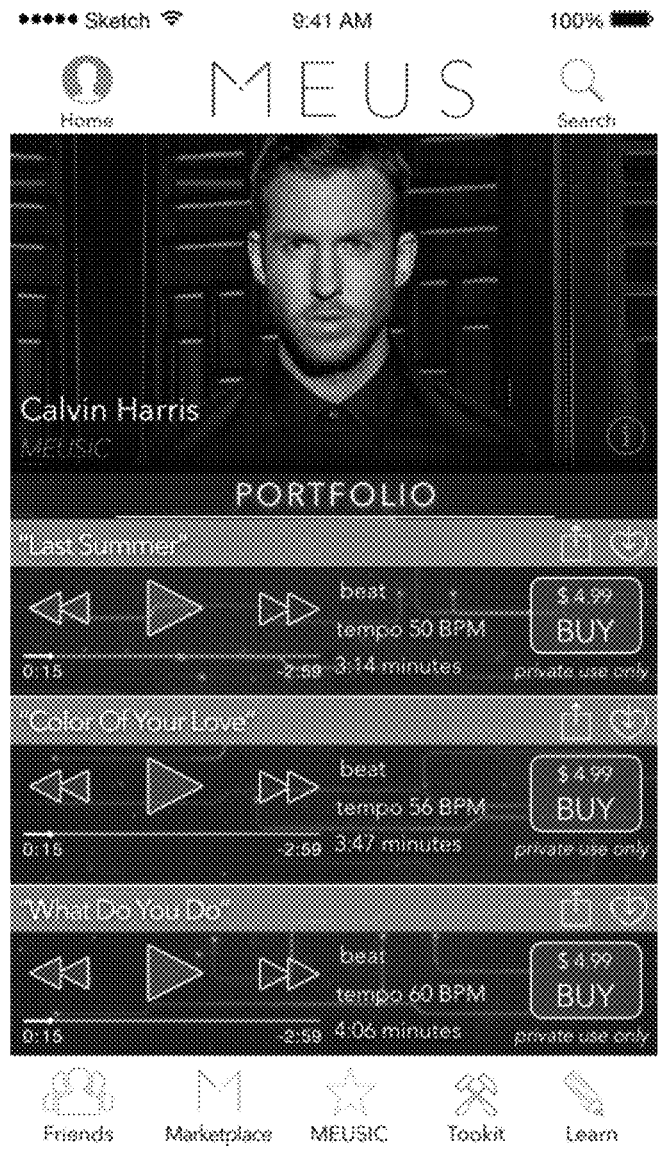
FIG. 18 is a rendering of an artist profile screen of the mobile application.

FIG. 18 is a rendering of an artist profile screen of the mobile application. In accordance with the preferred embodiment of the present invention, the application platform introduces a new way for Artists to interact with their favorite musicians and make music with them. Users could view their favorite Artists profile, find a beat they love, purchase & download it, and then build their own song on top of that beat. The user could then upload the finished product back onto the application platform as a new piece for their portfolio, and are able to share their finished creation with other members, critics, and friends within the application platform.

Artist's will create a profile with a portfolio, as well as some brief personal information. (Name, Bio, Age, Location, School, etc.). Investors can also create a profile, with the option to add some information about what kind of creative works they are looking to invest in. Brand Name Companies will create profiles that represent the company and express what type of artist(s) they are looking to sponsor. Record Companies will create a profile for their label. Their profiles will include a list of the A&R personnel that they have on the marketplace application network, and each A&R application member can set up a personal profile in addition to that of the record company.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

What is claimed is:

1. An apparatus for creating and distributing music compilations comprising:

an analog transducer and associated analog to digital converters for digitizing music and creating a file containing said digitized music for storage in digital memory;

said stored digitized music file containing music data files representing said stored digitized music compilations for storage in digital memory;

a second data file associated with said stored digitized music compilations containing information descriptive of the content determined by a musician corresponding with the stored digitized music compilations so that said music compilation is properly appraised as to its market value, prepared for user download, and prepared for marketing by its creator or those associated with its creator;

a data transmission channel for distributing said user uploaded stored digitized music compilations to an audience for purchase via download channels, for entertainment purposes, collaborative editing, including redistributing and brokering to other third person audiences and wherein said collaborative editing is facilitated by third party music creators seeking collaboration;

wherein copyrights associated with said stored digitized music compilations are stored electronically by a user and maintained by said user so that said user may shares said collaborative edition with third party users to insure that all creator and all licensing agents or owners associated with said digitized music compilations participate in any royalties distributed therefrom;

wherein said stored digitized music compilations is comprised of a copyright compilation consisting of a plurality of works from contributing artists and wherein an online shopping cart is utilized according to the present invention to account for artistic contributions of each of said artists and assign a monetization value so that copyright residual payment are distributed according to said accounting established by said shopping cart;

wherein negotiated copyright royalty divisions between various contributing artists are determined by artist representatives through use of the present invention; and wherein said copyright royalties are automatically apportioned to each copyright creator involved in the creative process and wherein each creation is subject to an auction to set a market rate for each of said contributions.

2. An apparatus according to claim 1 wherein said digitized music is created by at least one audio and at least one video program and can convert an audio download into a derivative piece of media.

3. An apparatus according to claim 1 wherein said at least one audio and said at least one video program is used to interface with said audience.

4. An apparatus according to claim 1 wherein said digitized music is comprised of a copyright compilation consisting of a plurality of works from contributing artists and wherein an online shopping cart is utilized according to the present invention to account for artistic contributions of each of said artists so that copyright residual payments are distributed according to said accounting established by said shopping cart.

5. An apparatus according to claim 4 wherein negotiated copyright royalty divisions between various contributing artists are determined by artist representatives through use of the present invention.

6. A method for creating and distributing music compilations comprising:
- digitizing music and creating a file containing said digitized music for storage in digital memory using an analog transducer and associated analog to digital converters;
- storing a digitized music file containing music data files representing said stored digitized music compilations in digital memory;
- supporting a second data file associated with said stored digitized music compilations containing information descriptive of the content determined by a musician corresponding with the stored digitized music compilations so that said music compilation is properly appraised as to its market value, prepared for user download, and prepared for marketing by its creator or those associated with its creator;
- transmitting, through a data transmission channel, said user uploaded stored digitized music compilations to an audience for distribution and purchase via download channels for entertainment purposes, collaborative editing, including redistributing and brokering to other third person audiences;
- live streaming content through said transmission channels;
- electronically storing copyrights associated with said stored digitized music compilations maintained by said user so that said user shares said collaborative edition with third party users to validate that all creator and all licensing agents or owners associated with said digitized music compilations participate in any royalties distributed therefrom;
- compiling a copyright of digitized music compilations is consisting of a plurality of works from contributing artists and wherein an online shopping cart is utilized according to the present invention to account for artistic contributions of each of said artists and assign a monetization value so that copyright residual payment are distributed according to said accounting established by said shopping cart;
- negotiating copyright royalty divisions between various contributing artists are determined by artist representatives through use of the present invention; and
- wherein automatically apportioning copyright royalties to each copyright creator involved in the creative process and wherein each creation is subject to an auction to set a market rate for each of said contributions.

7. A method according to claim 6 wherein said digitized music is created using at least one audio and at least one video program and can convert an audio download into a derivative piece of media.

8. A method according to claim 6 wherein said at least one audio and said at least one video is interfaced with said audience.

9. A method according to claim 6 wherein said digitized music is comprised of a copyright compilation consisting of a plurality of works from contributing artists and wherein an online shopping cart is utilized according to the present invention to account for artistic contributions of each of said artists so that copyright residual payments are distributed according to said accounting established by said shopping cart, and wherein said online shopping cart features bids for said artist's plurality of works.

10. A method according to claim 9 wherein negotiated copyright royalty divisions between various contributing artists is determined by artist representatives through use of the present invention.

* * * * *